US010205676B2

United States Patent
Zhao

(10) Patent No.: US 10,205,676 B2
(45) Date of Patent: Feb. 12, 2019

(54) RSCN METHOD AND SYSTEM, RELATED DEVICE AND COMPUTER STORAGE MEDIUM

(71) Applicant: ZTE Corporation, Shenzhen, Guangdong (CN)

(72) Inventor: Qingling Zhao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 40 days.

(21) Appl. No.: 15/501,959

(22) PCT Filed: Jan. 16, 2015

(86) PCT No.: PCT/CN2015/070927
§ 371 (c)(1),
(2) Date: Feb. 6, 2017

(87) PCT Pub. No.: WO2016/019708
PCT Pub. Date: Feb. 11, 2016

(65) Prior Publication Data
US 2017/0230305 A1 Aug. 10, 2017

(30) Foreign Application Priority Data
Aug. 8, 2014 (CN) .......................... 2014 1 0391722

(51) Int. Cl.
*G06F 15/177* (2006.01)
*H04L 12/721* (2013.01)
(Continued)

(52) U.S. Cl.
CPC ............ *H04L 47/762* (2013.01); *H04L 45/66* (2013.01); *H04L 45/745* (2013.01);
(Continued)

(58) Field of Classification Search
CPC ..... H04L 47/762; H04L 49/357; H04L 45/66; H04L 41/0618; H04L 49/25;
(Continued)

(56) References Cited

U.S. PATENT DOCUMENTS 7,386,608 B2 * 6/2008 Tsai ........................ H04L 41/00
370/230
8,458,306 B1 * 6/2013 Sripathi .............. H04L 41/0618
709/221
(Continued)

FOREIGN PATENT DOCUMENTS

CN 103368854 A 10/2013

OTHER PUBLICATIONS

Supplementary European Search Report in European application No. 15830752.0, dated Jul. 20, 2017 11 pgs.
(Continued)

*Primary Examiner* — Edan Orgad
*Assistant Examiner* — Vanneilian Lalchinthang
(74) *Attorney, Agent, or Firm* — Cooper Legal Group, LLC

(57) ABSTRACT

Disclosed are a RSCN method and system, a related device and a computer storage medium. The RSCN method applied to an Ethernet Node (ENode) device includes that: an RSCN message is received; and when it is determined that destination Media Access Control (MAC) contained in the RSCN message is ENode MAC, the RSCN message is distributed to a corresponding Virtual Node Port (VN_Port). The RSCN method applied to a Fiber Channel Over Ethernet (FCoE) Forwarder (FCF) includes that: network detection is performed; and when it is detected that a state to which attention is paid in a network changes, a first RSCN message is sent to an ENode device which pays attention to such a state change and succeeds in centralized notification capa-
(Continued)

bility negotiation with the FCF, destination MAC contained in the first RSCN message being ENode MAC. Disclosed are an ENode device, an FCF and an RSCN system.

12 Claims, 9 Drawing Sheets

(51) Int. Cl.
    *H04L 12/931*     (2013.01)
    *H04L 12/923*     (2013.01)
    *H04L 12/741*     (2013.01)
    *H04L 12/803*     (2013.01)
    *H04L 12/911*     (2013.01)
    *H04L 29/08*     (2006.01)

(52) U.S. Cl.
    CPC .......... *H04L 47/125* (2013.01); *H04L 47/746* (2013.01); *H04L 47/748* (2013.01); *H04L 49/357* (2013.01); *H04L 49/70* (2013.01); *H04L 67/1097* (2013.01)

(58) Field of Classification Search
    CPC ... H04L 45/745; H04L 47/125; H04L 47/746; H04L 67/1097; H04L 49/354; H04L 47/748; H04L 49/70; H04L 69/22; H04L 45/72; H04L 12/4625
    USPC .......................................................... 370/236
    See application file for complete search history.

(56) References Cited

U.S. PATENT DOCUMENTS

| | | | |
|---|---|---|---|
| 2004/0024852 A1* | 2/2004 | Chen | H04L 12/24 709/220 |
| 2004/0024855 A1 | 2/2004 | Tsai | |
| 2010/0115132 A1* | 5/2010 | Hirata | H04L 12/413 709/245 |
| 2011/0022693 A1* | 1/2011 | Cheethirala | H04L 49/357 709/222 |
| 2012/0177043 A1* | 7/2012 | Berman | H04L 12/4625 370/392 |
| 2012/0230340 A1* | 9/2012 | Armstrong | H04L 69/08 370/392 |
| 2015/0172184 A1* | 6/2015 | DeSanti | H04L 45/72 370/392 |

OTHER PUBLICATIONS

"Fibre Channel Link Services (FC-LS) REV 1.2", Jun. 2005, Bob Snively, Claudio Desanti, Craig W. Carlson,and James Coomes, Working Draft Proposed American National Standard for Information Technology, 84 pgs.

International Search Report in international application No. PCT/CN2015/070927, dated May 13, 2015, 2 pgs.

English Translation of the Written Opinion of the International Search Authority in international application No. PCT/CN2015/070927, dated May 13, 2015. 7 pgs.

"Fibre Channel Registered State Change Notification (RSCN) MIB (RFC4983)". C. Desanti, H.K. Vivek, K. McCloghrie, and S. Gai, Aug. 2007, Reprinted from the Internet at: https://www.heise.de/netze/rfc/rfcs/rfc4983.shtml, 28 pgs.

* cited by examiner

RSCN METHOD AND SYSTEM, RELATED DEVICE AND COMPUTER STORAGE MEDIUM

TECHNICAL FIELD

The disclosure relates to Fibre Channel Over Ethernet (FCoE), and more particularly to a Registered State Change Notification (RSCN) method and system, a related device and a computer storage medium.

BACKGROUND

An RSCN technology is responsible for, when a state of a device or an external device monitored by it changes, sending a change notification to other device which has been registered to pay attention to the state. When certain edge FCoE Forwarder (FCF) device senses a state change of a certain device in a network and Ethernet Node (ENode) device logging in the FCF device pays attention to the change, the FCF device may send an RSCN to a Virtual Node Port (VN_Port) of the related ENode device.

Along with continuous increase of a virtualization requirement, more and more technologies such as an N_Port Identifier Virtualization (NPIV) technology are applied. Each of ENode devices virtualizes many VN_Ports, and each of the VN_Ports may be independently registered in an FCF and receive an RSCN. As shown in FIG. 1, when sensing a state change of a device to which attention is paid in a network, an FCF may send an RSCN to all of registered VN_Ports within a short time, thereby impacting on the transmission network to cause a relatively heavy traffic load of the transmission network and relatively high processing pressure for the device.

SUMMARY

In view of this, for solving the existing technical problems, the embodiments of the disclosure provide the following technical solutions.

An RSCN method, applied to ENode device, includes that:

an RSCN message is received; and when it is determined that destination Media Access Control (MAC) contained in the RSCN message is ENode MAC, the RSCN message is distributed to a corresponding VN_Port.

In a specific example, the RSCN message may further contain state change information, and the step that the RSCN message is distributed to the corresponding VN_Port may include that:

the RSCN message is distributed to a VN_Port which pays attention to a state change type corresponding to the state change information contained in the RSCN message according to pre-stored state change types to which each of VN_Ports pays attention.

In a specific example, before the step that the RSCN message is received, the method may further include that:

a first State Change Registration (SCR) request message is sent, source MAC contained in the first SCR request message being the ENode MAC; and if a response message of which destination MAC is the ENode MAC is received within a preset time, it is determined that centralized notification capability negotiation succeeds, otherwise a second SCR request message is sent, source MAC contained in the second SCR request message being VN_Port MAC.

In a specific example, the method may further include that:

after the RSCN message is received, when it is determined that the destination MAC contained in the RSCN message is the VN_Port MAC, the RSCN message is sent to a VN_Port corresponding to the VN_Port MAC.

The embodiments of the disclosure also provide an RSCN method, applied to an FCF, wherein the method includes that:

network detection is performed; and when it is detected that a state to which attention is paid in a network changes, a first RSCN message is sent to an ENode device which pays attention to such a state change and succeeds in centralized notification capability negotiation with the FCF, destination MAC contained in the first RSCN message being ENode MAC.

In a specific example, the method may further include that:

an SCR request message is received, source MAC contained in the SCR request message being the ENode MAC; and when the FCF supports a centralized notification function, a first response message is returned to indicate that the centralized notification capability negotiation succeeds, the destination MAC contained in the first response message being the ENode MAC, otherwise the SCR request message is discarded or a second response message is returned to indicate that the centralized notification capability negotiation fails.

In a specific example, the method may further include that:

when it is detected that the state to which attention is paid in the network changes, at least one second RSCN message is sent to an ENode which pays attention to the state change and fails to succeed in centralized notification capability negotiation with the FCF, destination MAC contained in the second RSCN message being VN_Port MAC and each of the at least one second RSCN message corresponding to each of VN_Ports which pays attention to the state change under the ENode.

The embodiments of the disclosure also provide an RSCN method, including the abovementioned RSCN method for the FCF and the abovementioned RSCN method for the ENode device.

The embodiments of the disclosure also provide an ENode device, including: a receiving module and an RSCN agent module, wherein the receiving module is configured to receive an RSCN message; and the RSCN agent module is configured to, distribute the RSCN message to a corresponding VN_Port when it is determined that destination MAC contained in the RSCN message is ENode MAC.

In a specific example, the RSCN agent module may specifically be configured to distribute the RSCN message to a VN_Port which pays attention to a state change type corresponding to state change information contained in it according to pre-stored state change types to which each of VN_Ports pays attention.

In a specific example, the ENode device may further include a sending module, and the sending module may be configured to send a first SCR request message, source MAC contained in the first SCR request message being the ENode MAC, and when the receiving module fails to receive a response message of which destination MAC is the ENode MAC within a preset time or when the receiving module receives a centralized notification capability negotiation failure message, continue sending a second SCR request message, source MAC contained in the second SCR request message being VN_Port MAC.

The receiving module may further be configured to receive the response message.

In a specific example, the RSCN agent module may further be configured to, when it is determined that the destination MAC contained in the RSCN message received by the receiving module is the VN_Port MAC, send the RSCN message to a VN_Port corresponding to the VN_Port MAC.

The disclosure provides an FCF including: a detection module and a sending module, wherein the detection module is configured to perform network detection; and the sending module is configured to, when the detection module detects that a state to which attention is paid in a network changes, send a first RSCN message to ENode device which pays attention to such a state change and succeeds in centralized notification capability negotiation with the FCF, destination MAC contained in the first RSCN message being ENode MAC.

In a specific example, the FCF may further include: a receiving module, and the receiving module may be configured to receive an SCR request message; and the sending module may further be configured to, when source MAC contained in the SCR request message is the ENode MAC and the FCF supports a centralized notification function, return a first response message to indicate that the centralized notification capability negotiation succeeds, the destination MAC contained in the first response message being the ENode MAC, otherwise discard the SCR request message or return a second response message to indicate that centralized notification capability negotiation fails.

In a specific example, the sending module may further be configured to, when the detection module detects that the state to which attention is paid in the network changes, send at least one second RSCN message to an ENode which pays attention to the state change and fails to succeed in centralized notification capability negotiation with the FCF, destination MAC contained in the second RSCN message being VN_Port MAC and each of at least one second RSCN message corresponding to each of VN_Ports which pays attention to the state change under the ENode.

The embodiments of the disclosure also provide an RSCN system, including an ENode device and an FCF, wherein the ENode device may be the abovementioned ENode device; and the FCF may be the abovementioned FCF.

The embodiments of the disclosure also provide a computer storage medium having computer-executable instructions stored therein, the computer-executable instructions being configured to execute the abovementioned method.

According to the RSCN method and system, related device and computer storage medium provided by the embodiments of the disclosure, after the ENode device and the FCF succeed in centralized notification capability negotiation, the FCF sends only one RSCN to the VN_Ports on the same ENode device, and the ENode device distributes the centralized RSCN to the related VN_Ports, so that a number of RSCNs between the edge FCF and the ENode device is reduced, a traffic load in an intermediate bearer network is reduced, processing pressure of the device is also reduced, and a notification flow is accelerated.

DETAILED DESCRIPTION

Based on a related technology, when an ENode device virtualizes many VN_Ports logging in a certain FCF, if the FCF detects a state change in a network, it is necessary to send an RSCN to all of the VN_Ports of the same ENode device, which pay attention to the state change. As such, a certain impact may be generated on the transmission network within a short time. In order to solve the problem, the embodiments of the disclosure provide a centralized RSCN message method, to reduce a traffic burden in an intermediate bearer network.

Figure 1:
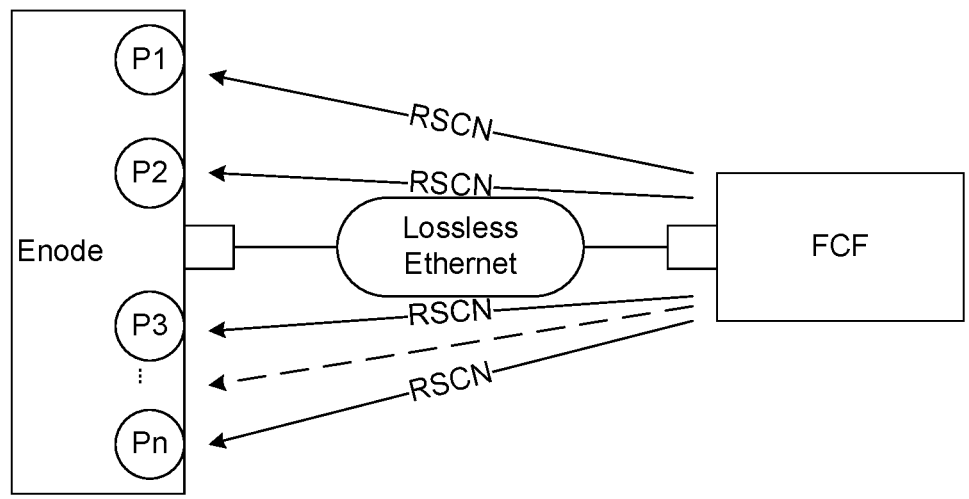
FIG. 1 is a schematic diagram illustrating a related-technology-based RSCN scenario.
Figure 2:
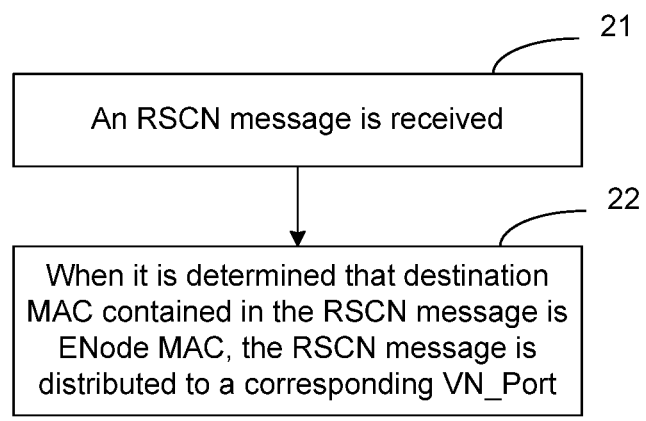
FIG. 2 is a flowchart showing an RSCN method applied to an ENode device according to an embodiment of the disclosure.

FIG. 2 is a flowchart showing an RSCN method applied to an ENode device according to an embodiment of the disclosure. As shown in FIG. 2, the method includes the following steps.

Step 21: an RSCN message is received; and

Step 22: when it is determined that destination MAC contained in the RSCN message is ENode MAC, the RSCN message is distributed to a corresponding VN_Port.

Preferably, in an embodiment of the disclosure, the RSCN message further contains state change information, and the step that the RSCN message is distributed to the corresponding VN_Port includes that:

the RSCN message is distributed to a VN_Port which pays attention to a state change type corresponding to the state change information contained in it according to pre-stored state change types to which each VN_Port pays attention.

It is noted that the term "state change" may be state changes of various forms such as a fabric detected state change, an Nx_Port detected state change and network name changed.

It is noted that every time when a VN_Port is registered in an FCF, the ENode device may acquire a state change type to which the VN_Port pays attention according to a pre-configured strategy and send the state change type to the FCF via a registration request. The FCF stores state change types to which VN_Ports and/or the ENode device pays attention. When detecting a state change, the FCF sends an RSCN to the corresponding VN_Port and/or the ENode device according to the state change type to which the VN_Port and/or the ENode device pays attention.

Figure 3:
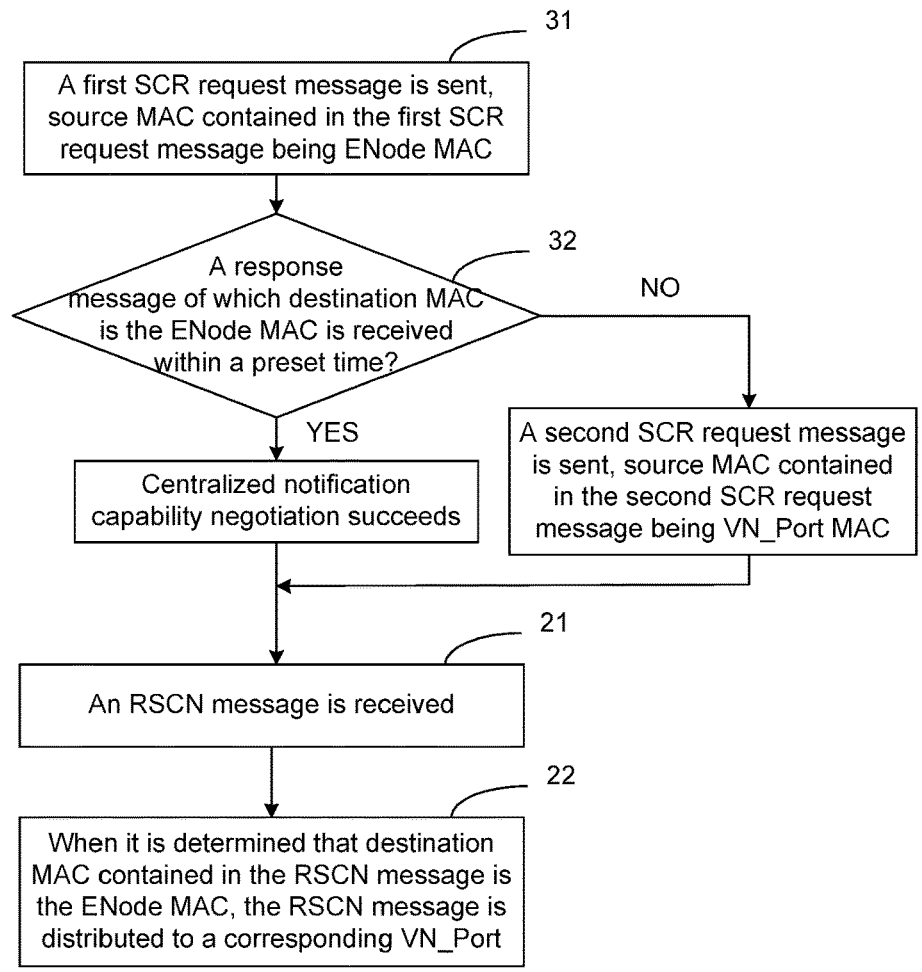
FIG. 3 is a flowchart showing another RSCN method applied to an ENode device according to an embodiment of the disclosure.

Preferably, as shown in FIG. 3, in an embodiment of the disclosure, before the step that the RSCN message is received, the method further includes:

Step 31: a first SCR request message is sent, source MAC contained in the first SCR request message being the ENode MAC; and Step 32: if a response message of which destination MAC is the ENode MAC is received within a preset time, it is determined that centralized notification capability negotiation succeeds, otherwise a second SCR request message is sent, source MAC contained in the second SCR request message being VN_Port MAC.

Preferably, in an embodiment of the disclosure, the method further includes that:

after the RSCN message is received, when it is determined that the destination MAC contained in the RSCN message is the VN_Port MAC, the RSCN message is sent to a VN_Port corresponding to the VN_Port MAC.

Figure 4:
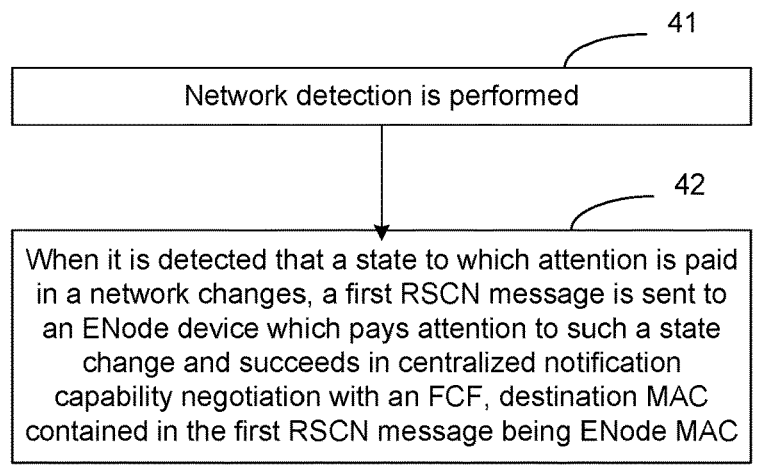
FIG. 4 is a flowchart showing an RSCN method applied to an FCF according to an embodiment of the disclosure.

The embodiments of the disclosure also provide an RSCN method applied to an FCF, and as shown in FIG. 4, the method includes:

Step 41: network detection is performed; and

Step 42: when it is detected that a state to which attention is paid in a network changes, a first RSCN message is sent to an ENode device which pays attention to such a state change and succeeds in centralized notification capability negotiation with the FCF, destination MAC contained in the first RSCN message being ENode MAC.

Figure 5:
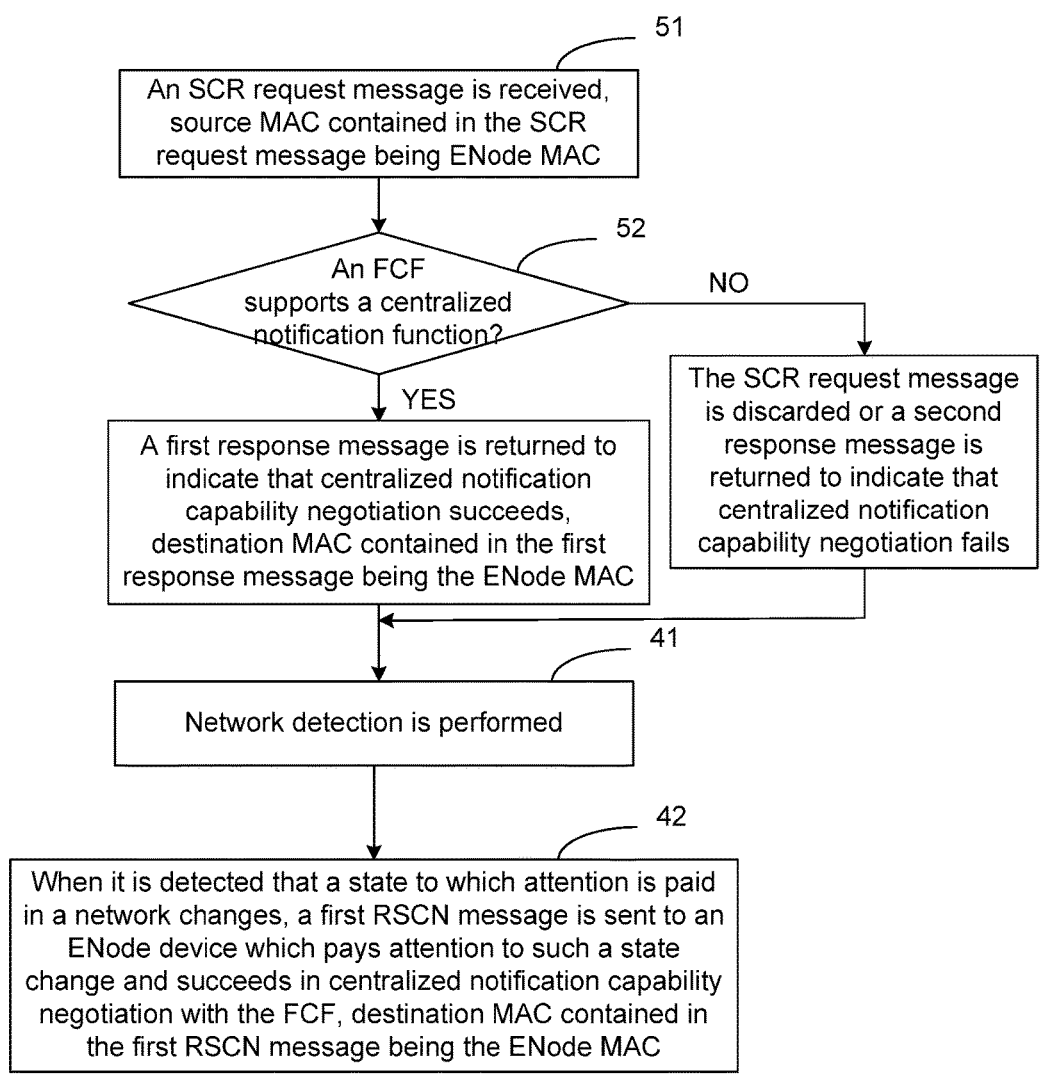
FIG. 5 is a flowchart showing another RSCN method applied to an FCF according to an embodiment of the disclosure.

Preferably, as shown in FIG. 5, in an embodiment of the disclosure, the method further includes:

Step 51: an SCR request message is received, source MAC contained in the SCR request message being the ENode MAC; and Step 52: when the FCF supports a centralized notification function, a first response message is returned to indicate that the centralized notification capability negotiation succeeds, destination MAC contained in the first response message being the ENode MAC, otherwise the SCR request message is discarded or a second response message is returned to indicate that the centralized notification capability negotiation fails.

Preferably, in an embodiment of the disclosure, the method further includes that:

when it is detected that the state to which attention is paid in the network changes, at least one second RSCN message is sent to an ENode which pays attention to the state change and fails to succeed in the centralized notification capability negotiation with the FCF, destination MAC contained in the second RSCN message being VN_Port MAC and each of the at least one second RSCN message corresponding to each of VN_Ports which pays attention to the state change under the ENode.

It is noted that in the embodiment of the disclosure, for the same ENode, only one first RSCN message is required to be sent and multiple second RSCN messages are usually required to be sent.

The embodiments of the disclosure also provide a corresponding RSCN method, which includes that:

an FCF performs RSCN by means of the abovementioned method applied to the FCF (referring to FIG. 4 or FIG. 5); and an ENode device performs RSCN by means of the abovementioned method applied to the ENode device (referring to FIG. 2 or FIG. 3).

Figure 6:
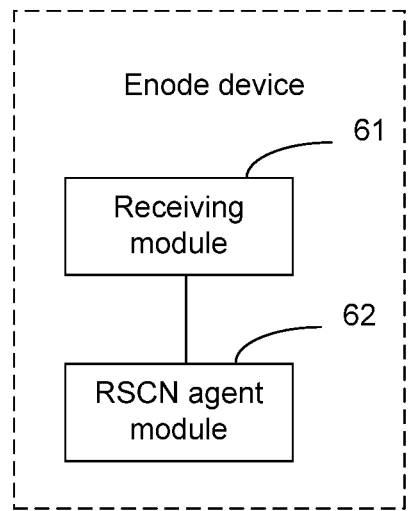
FIG. 6 is a structure diagram illustrating an ENode device according to an embodiment of the disclosure.

The embodiments of the disclosure also provide an ENode device. As shown in FIG. 6, the ENode device includes: a receiving module 61 and an RSCN agent module 62, wherein the receiving module 61 is configured to receive an RSCN message; and the RSCN agent module 62 is configured to, when it is determined that destination MAC contained in the RSCN message is ENode MAC, distribute the RSCN message to a corresponding VN_Port.

Preferably, in an embodiment of the disclosure, the RSCN agent module 62 is specifically configured to distribute the RSCN message to a VN_Port which pays attention to a state change type corresponding to state change information contained in the RSCN message according to pre-stored state change types to which each of VN_Ports pays attention.

Figure 7:
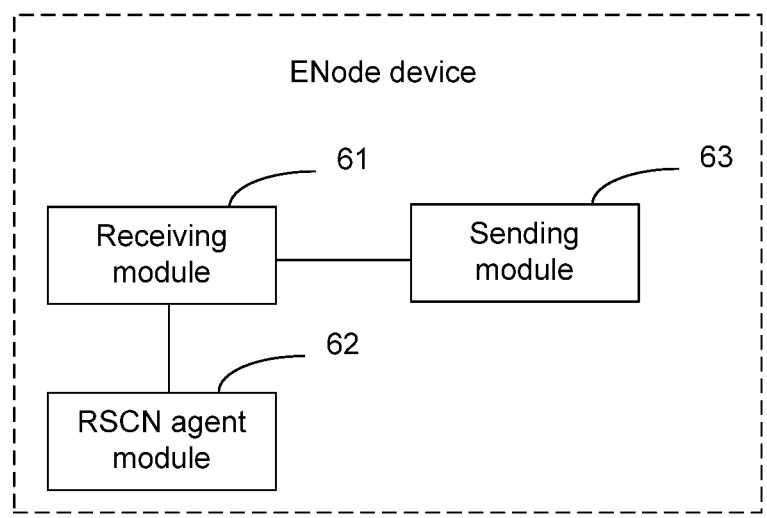
FIG. 7 is a structure diagram illustrating another ENode device according to an embodiment of the disclosure.

Preferably, as shown in FIG. 7, in an embodiment of the disclosure, the ENode device further includes a sending module 63, and the sending module 63 is configured to send a first SCR request message, source MAC contained in the first SCR request message being the ENode MAC, and when the receiving module fails to receive a response message of which destination MAC is the ENode MAC within a preset time or when the receiving module receives a centralized notification capability negotiation failure message, continue sending a second SCR request message, source MAC contained in the second SCR request message being VN_Port MAC.

The receiving module 61 is further configured to receive the response message.

Preferably, in an embodiment of the disclosure, the RSCN agent module 62 is further configured to, when it is determined that the destination MAC contained in the RSCN message received by the receiving module is the VN_Port MAC, send the RSCN message to a VN_Port corresponding to the VN_Port MAC.

Figure 8:
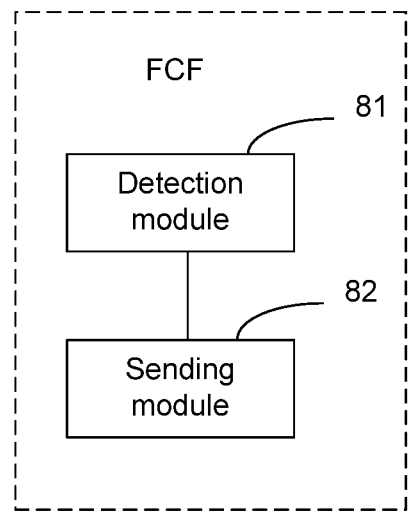
FIG. 8 is a structure diagram illustrating an FCF according to an embodiment of the disclosure.

The disclosure also provides a corresponding FCF. As shown in FIG. 8, the FCF includes: a detection module 81 and a sending module 82, wherein the detection module 81 is configured to perform network detection; and the sending module 82 is configured to, when the detection module 81 detects that a state to which attention is paid in a network changes, send a first RSCN message to an ENode device which pays attention to such a state change and succeeds in centralized notification capability negotiation with the FCF, destination MAC contained in the first RSCN message being ENode MAC.

Figure 9:
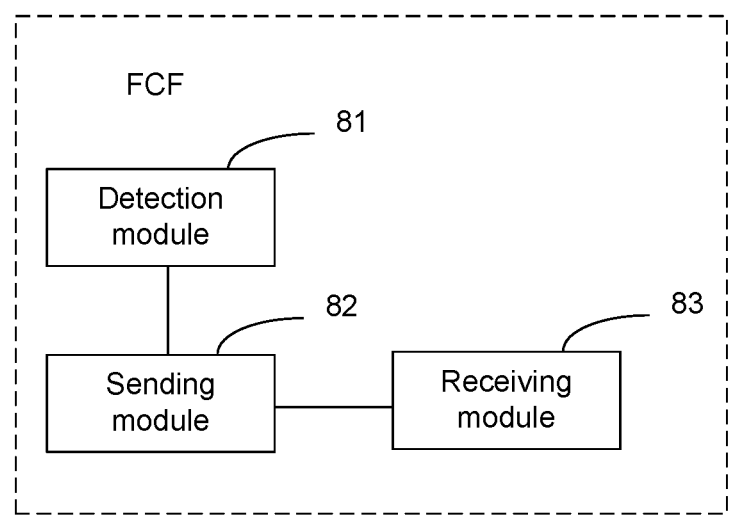
FIG. 9 is a structure diagram illustrating another FCF according to an embodiment of the disclosure.

Preferably, as shown in FIG. 9, in an embodiment of the disclosure, the FCF further includes: a receiving module 83, and the receiving module 83 is configured to receive an SCR request message; and the sending module 82 is further configured to, when source MAC contained in the SCR request message is the ENode MAC and the FCF supports a centralized notification function, return a first response message to indicate that the centralized notification capability negotiation succeeds, destination MAC contained in the first response message being the ENode MAC, otherwise discard the SCR request message or return a second response message to indicate that the centralized notification capability negotiation fails.

Preferably, in an embodiment of the disclosure, the sending module 82 is further configured to, when the detection module 81 detects that the state to which attention is paid in the network changes, send at least one second RSCN message to an ENode which pays attention to the state change and fails to succeed in centralized notification capability negotiation with the FCF, destination MAC contained in the second RSCN message being VN_Port MAC and each of the at least one second RSCN message corresponding to each of VN_Ports which pays attention to the state change under the ENode.

The embodiments of the disclosure also correspondingly provide an RSCN system including an ENode device and an FCF, wherein the ENode device is the ENode device mentioned in any one of the above embodiments (referring to FIG. 6 or FIG. 7); and the FCF is the FCF mentioned in any one of the above embodiments (referring to FIG. 8 or FIG. 9).

The embodiments of the disclosure also disclose a computer storage medium having computer-executable instructions stored therein, the computer-executable instructions being configured to execute the method mentioned in any one of the above method embodiments.

By the solutions according to the embodiments of the disclosure, the FCF is allowed to send only one centralized RSCN to a certain ENode, and is not required to independently and respectively send the RSCN to each of the VN_Ports of the ENode. The ENode distributes the centralized RSCN message to the local related VN_Port, so that a number of RSCNs between the edge FCF and the ENode is reduced, a traffic burden in an intermediate bearer network is reduced, processing pressure of the device is also reduced, and a notification flow is accelerated.

The technical solutions of the disclosure will be further described below with specific examples in detail.

Specific Example 1

The technology according to the disclosure requires support of an ENode device and an FCF device at both ends, and thus negotiation about a centralized RSCN capability is performed through an SCR flow at first. Capability negotiation is usually initiated by the ENode device supporting a function of the disclosure.

Figure 10:
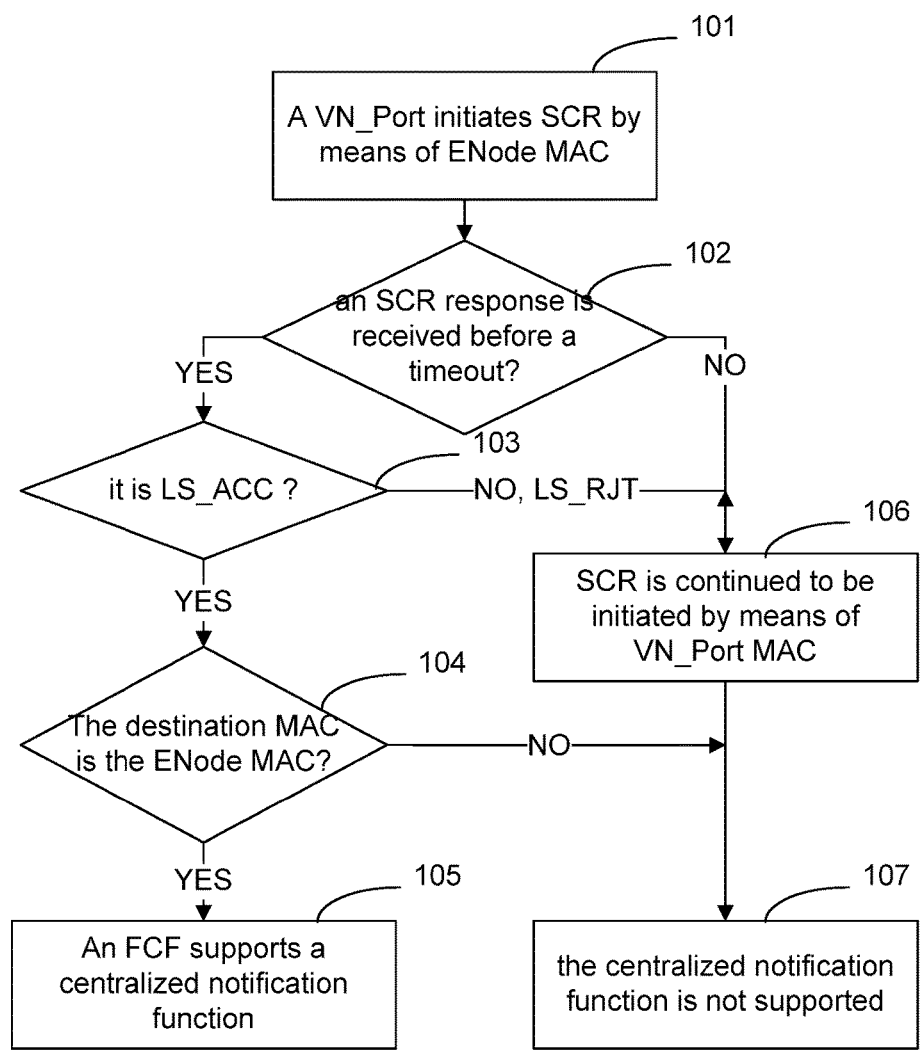
FIG. 10 is a flowchart showing negotiation about a centralized notification capability between an ENode and an FCF according to specific example 1 of the disclosure.

A process of negotiation about a centralized notification capability between an ENode and an FCF is described in the embodiment. FIG. 10 is a flowchart of negotiation about a centralized notification capability between an ENode and an FCF according to specific example 1 of the disclosure. As shown in FIG. 10, the flow includes the following steps.

Step 101: a VN_Port initiates SCR by means of ENode MAC.

Here, after the VN_Port logs in an FCF, the VN_Port initiates SCR to the FCF, and it uses Ethernet header source MAC as the ENode MAC, and simultaneously starts a timer to wait for a registration response. If an SCR LS_ACC response returned by the FCF is received before the timer expires and destination MAC is local ENode MAC, it is determined that the FCF supports a centralized notification function. If no response is received after a timeout of the timer, or an LS_RJT response is received, standard SCR is continued to be initiated by means of VN_Port MAC, and meanwhile, it is determined that the FCF does not support the centralized notification function and a local RSCN agent module is not required to be started. If the destination MAC of the received LS_ACC is not the ENode MAC but the VN_Port MAC, it is determined that the FCF does not support the centralized notification function.

Step 102: it is judged whether an SCR response is received before a timeout period or not, Step 103 is executed if YES, otherwise Step 106 is executed.

Step 103: it is judged whether the received SCR response is LS_ACC or not, Step 104 is executed if YES, otherwise Step 106 is executed.

Step 104: it is judged whether destination MAC of the LS_ACC is the ENode MAC or not, Step 105 is executed if YES, otherwise Step 107 is executed.

Step 105: it is determined that the FCF supports a centralized notification function and negotiation succeeds.

Step 106: SCR is continued to be initiated by means of VN_Port MAC.

Step 107: it is determined that the FCF does not support the centralized notification function, and negotiation fails.

According to the above description, when performing SCR in the FCF, the ENode takes the ENode MAC as source MAC of a registration request instead of N_Port MAC; and the FCF returns a registration response by taking the ENode MAC as the destination MAC after receiving the registration request, and after the ENode receives the response of which the destination MAC is the local ENode MAC, negotiation about the centralized notification capability between the two devices succeeds.

Specific Example 2

When the FCF device receives an SCR registration request, it is judged whether its source MAC is ENode MAC which has logged in the local device or not, and if YES, it is determined that ENode device is performing negotiation about a centralized notification capability. If the FCF device supports a centralized notification function, SCR LS_ACC is returned by taking the ENode MAC as destination MAC, and meanwhile, it is marked that the ENode device supports the centralized notification function. If the FCF device does not support the centralized notification function, the SCR registration request of which the source MAC is the ENode MAC may be discarded or LS_RJT may be returned.

Figure 11:
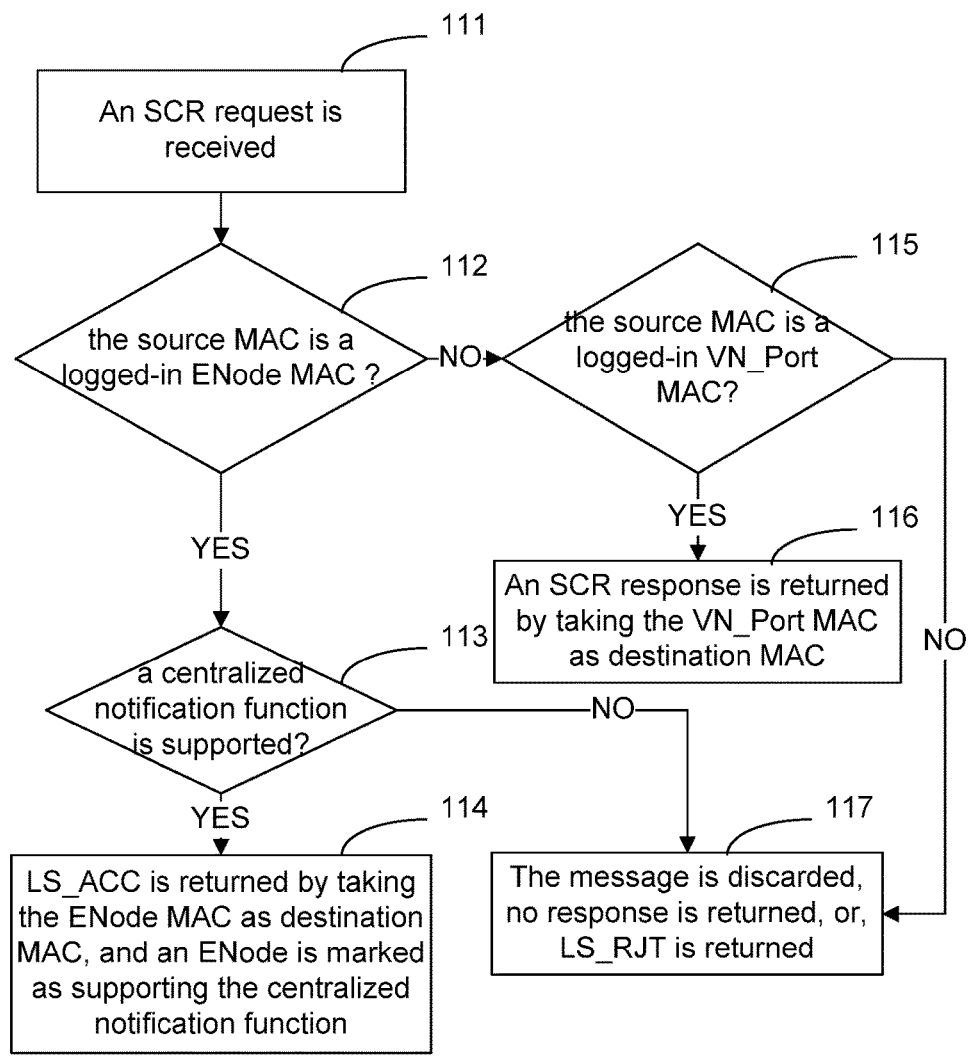
FIG. 11 is a flowchart showing negotiation about a centralized notification capability between an FCF and an ENode according to specific example 2 of the disclosure.

A specific flow of this example is shown in FIG. 11, and the flow includes:

Step 111: an SCR registration request is received;

Step 112: it is judged whether source MAC is ENode MAC which has logged in or not, Step 113 is executed if YES, otherwise Step 115 is executed;

Step 113: it is judged whether an FCF supports a centralized notification function or not, Step 114 is executed if YES, otherwise Step 117 is executed;

Step 114: LS_ACC is returned by taking the ENode MAC as destination MAC, and an ENode is marked as supporting the centralized notification function;

Step 115: it is judged whether the source MAC is VN_Port MAC which has logged in or not, Step 116 is executed if YES, otherwise Step 117 is executed;

Step 116: an SCR response is returned by taking the VN_Port MAC as destination MAC; and Step 117: the message is discarded and no response is returned, or, LS_RJT is returned.

Specific Example 3

A flow of initiating centralized RSCN by an FCF is described in the embodiment, wherein when the FCF detects that a device (including the FCF) to which attention is paid in a network has a state change, an RSCN packet is sent to an ENode supporting centralized notification, with the destination MAC of the RSCN packet ENode MAC. If a certain ENode is marked by the FCF to support a centralized notification function, an RSCN is sent by taking ENode MAC of the ENode as destination MAC. If the ENode is marked as not supporting the centralized notification function, the RSCN is sent to all of VN_Ports of the ENode respectively.

Figure 12:
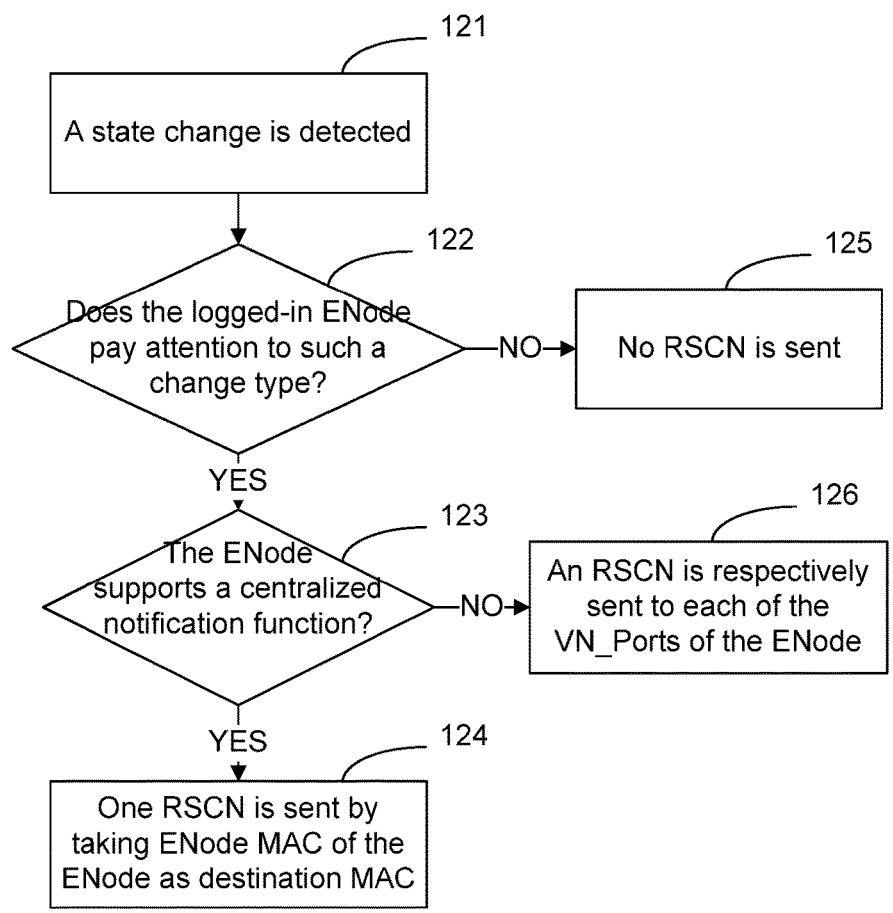
FIG. 12 is a flowchart of initiating centralized RSCN by an FCF according to specific example 3 of the disclosure.

As shown in FIG. 12, the flow of initiating centralized RSCN by the FCF in the embodiment of the disclosure specifically includes:

Step 121: a state change is detected;

Step 122: it is judged whether a logged-in ENode pays attention to such a change type or not, Step 123 is executed if YES, otherwise Step 125 is executed;

Step 123: it is judged whether the ENode supports a centralized notification function or not, Step 124 is executed if YES, otherwise Step 126 is executed;

Step 124: an RSCN is sent by taking ENode MAC of the ENode as destination MAC;

Step 125: no RSCN is sent; and

Step 126: the RSCN is independently sent to each of the VN_Ports of the ENode.

Specific Example 4

The ENode device supporting a centralized notification function in the disclosure is required to manage VN_Ports which pay attention to different state notification types. An RSCN agent module is defined in the embodiment, and is responsible for managing all of local VN_Ports which pay attention to a certain state change type. When an RSCN of which destination MAC is ENode MAC is received, the RSCN is distributed to these VN_Ports for processing respectively.

Figure 13:
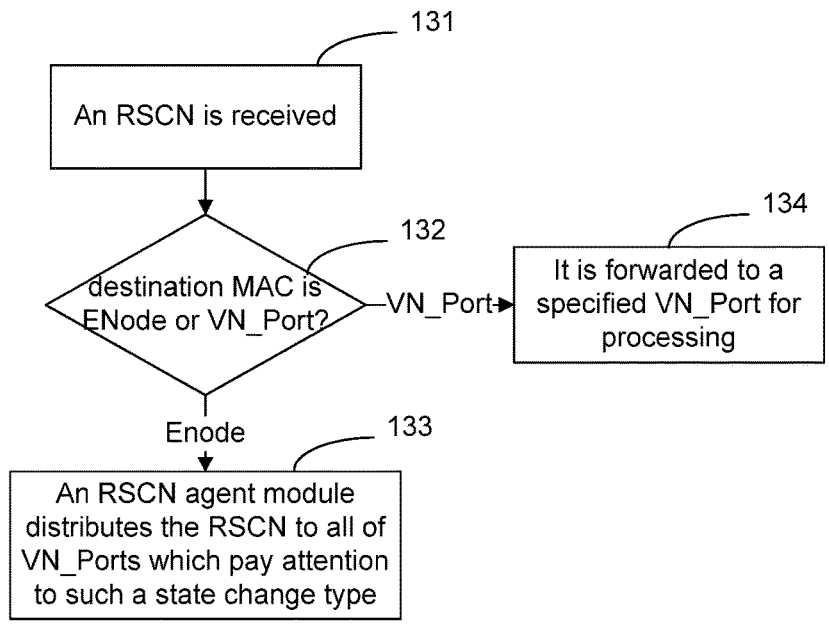
FIG. 13 is a flowchart of distributing an RSCN message by an RSCN agent module according to specific example 4 of the disclosure.

A flowchart of distributing an RSCN message by an RSCN agent module is described in the example, and as shown in FIG. 13, the flow includes:

Step 131: an RSCN is received;

Step 132: it is judged whether destination MAC is ENode or VN_Port, Step 133 is executed if it is ENode, otherwise Step 134 is executed;

Step 133: the RSCN agent module distributes the RSCN to all of the VN_Ports which pay attention to a corresponding state change type; and Step 134: the RSCN agent module forwards the RSCN to a specified VN_Port for processing.

Figure 14:
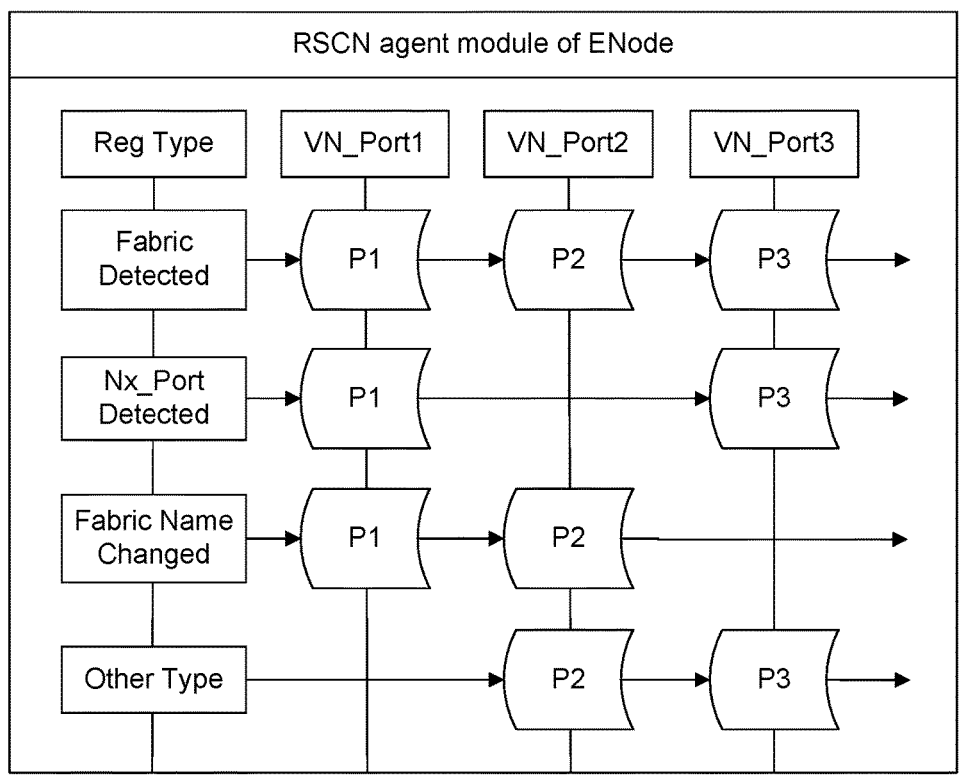
FIG. 14 is a schematic diagram illustrating data management by an RSCN agent module according to specific example 4 of the disclosure.

FIG. 14 is a schematic diagram illustrating data management by an RSCN agent module according to specific example 4 of the disclosure. As shown in FIG. 14, in the embodiment, a state change type to which a VN_Port 1 pays attention includes a fabric detected state change, an Nx_Port detected state change and network name changed, a VN_Port 2 pays attention to the fabric detected state change, the network name changed and state changes of some other types, and a VN_Port 3 pays attention to the fabric detected state change, the Nx_Port detected state change and state changes of some other types.

By the methods mentioned in the embodiments, a number of RSCNs between the edge FCF and the ENode device may be reduced, a traffic burden of the network may be reduced, processing pressure of the device may also be reduced, and a notification flow may be accelerated.

Each of the abovementioned modules may be implemented by a Central Processing Unit (CPU), Digital Signal Processor (DSP) or Field-Programmable Gate Array (FPGA) in electronic device.

Those skilled in the art should know that the embodiments of the disclosure may be provided as a method, a system or a computer program product. Therefore, the disclosure may adopt a form of hardware embodiment, software embodiment and a combination thereof. Moreover, the disclosure may adopt a form of computer program product implemented on one or more computer-available storage media (including, but not limited to, a disk memory and an optical memory) including computer-available program codes.

The disclosure is described with reference to flowcharts and/or block diagrams of the method, device (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing device to generate a machine, so that a device for realizing a function specified in one flow or more flows in the flowcharts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or many flows in the flowcharts and/or one block or many blocks in the block diagrams are provided by the instructions executed on the computer or the other programmable data processing device.

The above is only the preferred embodiments of the disclosure and not intended to limit the scope of the disclosure.

The invention claimed is:

1. A Registered State Change Notification (RSCN) method, applied to an Ethernet Node (ENode) device, comprising:

sending a first State Change Registration (SCR) request message, a source Media Access Control (MAC) contained in the first SCR request message being an ENode MAC;

determining that a centralized notification capability negotiation succeeds when a response message of which destination MAC is the ENode MAC is received within a preset time, otherwise sending a second SCR request message, the source MAC contained in the second SCR request message being a Virtual Node Port (VN Port) MAC, wherein the centralized notification capability negotiation is used for indicating that the ENode device only receives one RSCN message and distributes the RSCN message to a corresponding VN Port;

receiving the RSCN message; and distributing the RSCN message to the corresponding VN Port when it is determined that the destination MAC contained in the RSCN message is the ENode MAC.

2. The method according to claim 1, wherein the RSCN message further contains state change information, and distributing the RSCN message to the corresponding VN_Port comprises:

distributing the RSCN message to the VN_Port which pays attention to a state change type corresponding to the state change information contained in the RSCN message according to a pre-stored state change type to which each of the VN_Ports pays attention.

3. The method according to claim 1, further comprising:

after the RSCN message is received, when it is determined that the destination MAC contained in the RSCN message is the VN_Port MAC, sending the RSCN message to the VN_Port corresponding to the VN_Port MAC.

4. A Registered State Change Notification (RSCN) method, applied to a Fibre Channel Over Ethernet (FCoE) Forwarder (FCF), comprising:

receiving a State Change Registration (SCR) request message, a source Media Access Control (MAC) contained in the SCR request message being an Ethernet Node (ENode) MAC; and when the FCF supports a centralized notification function, returning a first response message to indicate that a centralized notification capability negotiation succeeds, a destination MAC contained in the first response message being the ENode MAC, otherwise discarding the SCR request message or returning a second response message to indicate that the centralized notification capability negotiation fails, wherein the centralized notification capability negotiation is used for indicating that an ENode device only receives one RSCN message and distributes the RSCN message to a corresponding Virtual Node Port (VN Port);

performing network detection; and when it is detected that a state to which attention is paid in a network changes, sending a first RSCN message to the ENode device which pays attention to such the state change and succeeds in the centralized notification capability negotiation with the FCF, the destination MAC contained in the first RSCN message being the ENode MAC.

5. The method according to claim 4, further comprising:

when it is detected that the state to which the attention is paid in the network changes, sending at least one second RSCN message to the ENode device which pays attention to the state change and fails to succeed in the centralized notification capability negotiation with the FCF, the destination MAC contained in the second RSCN message being a VN Port MAC and each of the at least one second RSCN message corresponding to each of the VN_Ports which pays attention to the state change under the ENode device.

6. An Ethernet Node (ENode) device, comprising a processor and a memory storing computer-readable operation instructions, wherein when the computer-readable operation instructions in the memory are run, the processor is arranged to:

send a first State Change Registration (SCR) request message, a source Media Access Control (MAC) contained in the first SCR request message being an ENode MAC, and when the processor fails to receive a response message of which destination MAC is the ENode MAC within a preset time or when the processor receives a centralized notification capability negotiation failure message, continue sending a second SCR request message, the source MAC contained in the second SCR request message being a Virtual Node Port (VN Port) MAC, wherein the centralized notification capability negotiation failure message is used for indicating that the ENode device only receives one Registered State Change Notification (RSCN) message and distributes the RSCN message to a corresponding VN Port, receive the response message and receive the RSCN message; and distribute the RSCN message to the corresponding VN Port when it is determined that the destination MAC contained in the RSCN message is the ENode MAC.

7. The ENode device according to claim 6, wherein the processor is arranged to: distribute the RSCN message to the VN_Port which pays attention to a state change type corresponding to state change information contained in the RSCN message according to pre-stored state change types to which each of VN_Ports pays attention.

8. The ENode device according to claim 6, wherein the processor is arranged to: when it is determined that the destination MAC contained in the RSCN message received by the processor is the VN_Port MAC, send the RSCN message to the VN_Port corresponding to the VN_Port MAC.

9. A Fibre Channel Over Ethernet (FCoE) Forwarder (FCF), comprising a processor and a memory storing computer-readable operation instructions, wherein when the computer-readable operation instructions in the memory are run, the processor is arranged to:

receive a State Change Registration (SCR) request message; and when a source Media Access Control (MAC) contained in the SCR request message is an Ethernet Node (ENode) MAC and the FCF supports a centralized notification function, return a first response message to indicate that a centralized notification capability negotiation succeeds, a destination MAC contained in the first response message being the ENode MAC, otherwise discard the SCR request message or return a second response message to indicate that the centralized notification capability negotiation fails, wherein the centralized notification capability negotiation is used for indicating that an ENode device only receives one Registered State Change Notification (RSCN) message and distributes the RSCN to a corresponding Virtual Node Port (VN Port);

perform network detection; and when the processor detects that a state to which attention is paid in a network changes, send a first RSCN message to the ENode device which pays attention to such the state change and succeeds in the centralized notification capability negotiation with the FCF, the destination MAC contained in the first RSCN message being the ENode MAC.

10. The FCF according to claim 9, wherein
the processor is further arranged to: when the processor detects that the state to which the attention is paid in the network changes, send at least one second RSCN message to the ENode device which pays attention to the state change and fails to succeed in the centralized notification capability negotiation with the FCF, the destination MAC contained in the second RSCN message being a VN Port MAC and each of the at least one second RSCN message corresponding to each of the VN_Ports which pays attention to the state change under the ENode device.

11. The method according to claim 2, further comprising:
after the RSCN message is received, when it is determined that the destination MAC contained in the RSCN message is the VN_Port MAC, sending the RSCN message to the VN_Port corresponding to the VN_Port MAC.

12. The ENode device according to claim 7, wherein
the processor is further arranged to: when it is determined that the destination MAC contained in the RSCN message received by the processor is the VN_Port MAC, send the RSCN message to the VN_Port corresponding to the VN_Port MAC.

* * * * *